Patented May 31, 1938

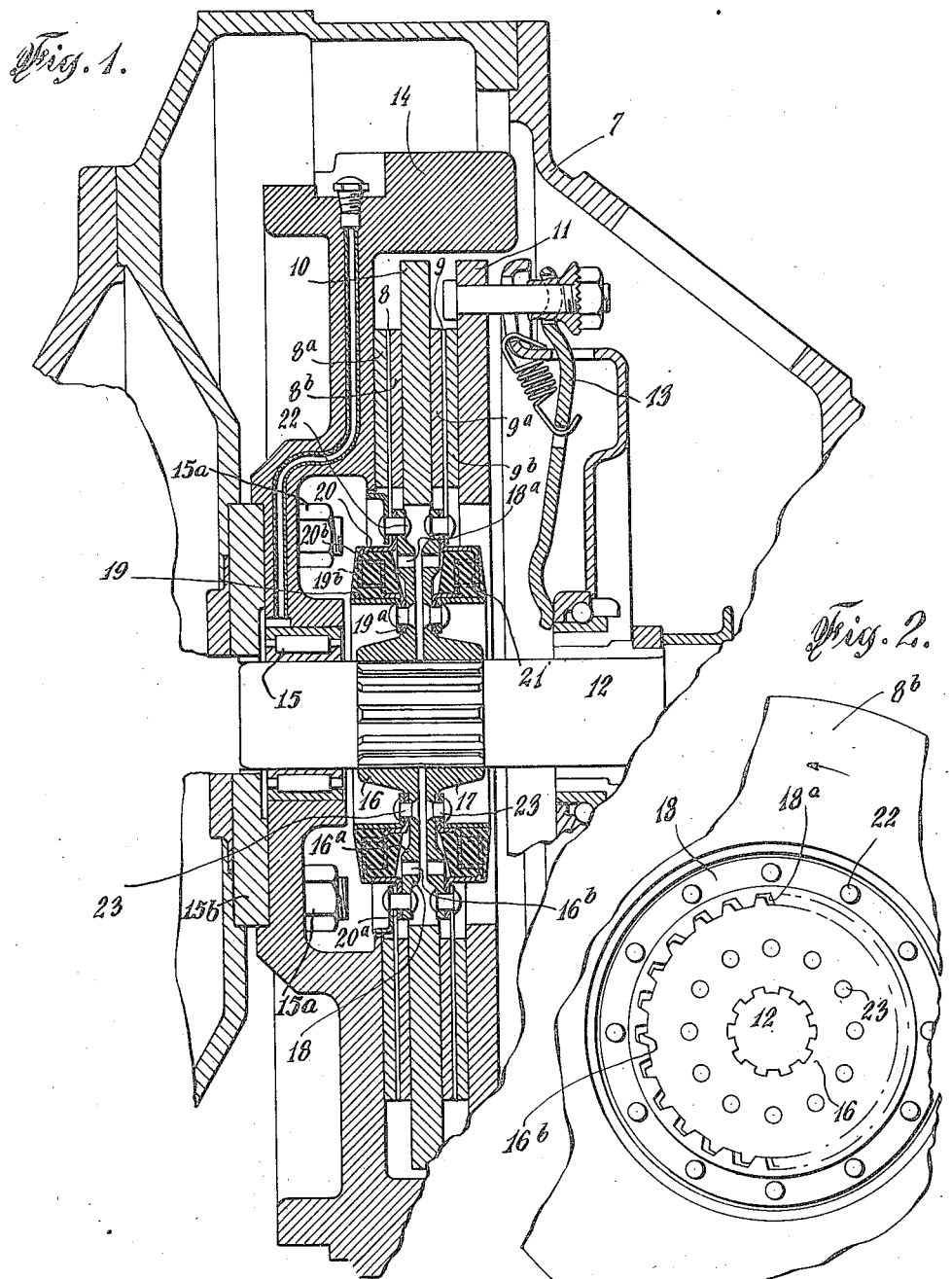

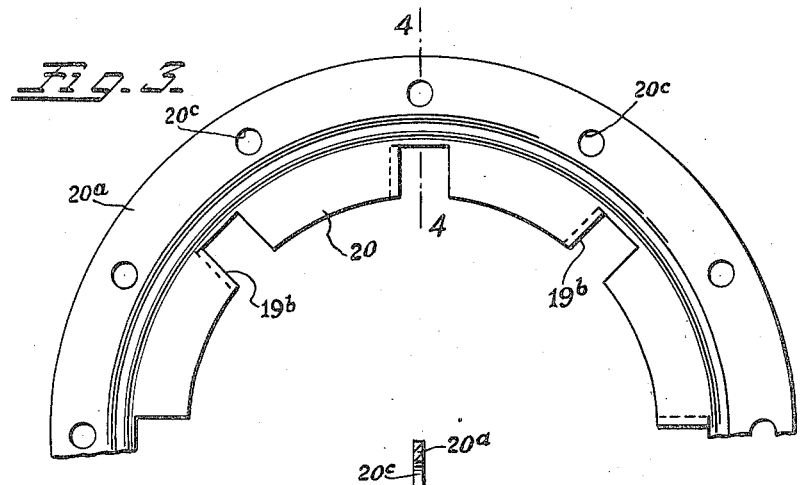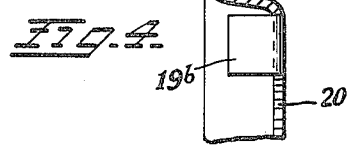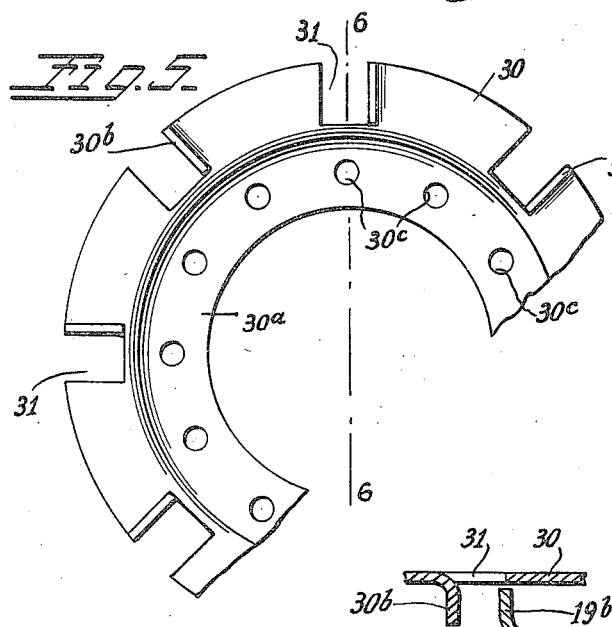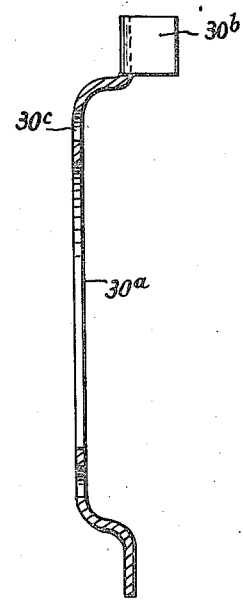

2,118,913

UNITED STATES PATENT OFFICE 2,118,913

POWER TRANSMITTING MECHANISM

Benjamin B. Bachman, Philadelphia, Pa., assignor to The Autocar Company, Ardmore, Pa., a corporation of Pennsylvania Application November 24, 1934, Serial No. 754,571

2 Claims. (Cl. 192—69)

This invention relates generally to power transmitting means and is more particularly directed to improvements in clutch mechanisms employed in connecting a driving element to one which is to be driven therefrom, as, for example, in transmitting the torque from the crank-shaft of an engine in an automotive vehicle to the transmission drive shaft.

While my invention, as will become evident from the description thereof, possesses a wide range of utility in the machine art, as well as in the automotive and other fields, for the purposes of this disclosure, I have elected to treat it more or less specifically, as it may be applied in the construction and operation of motor-vehicles of the conventional design, in which the internal combustion engine is connected, at will, to the shaft of a change-speed gear set by the functioning of a clutch mechanism interposed in the power line, between the driving and driven elements. It will be understood, however, that this is merely illustrative and is not to be construed, in any sense, as a limitation of the scope of my invention.

As is well known, the standard type of clutch mechanism employed in motor-vehicle construction, embodies a plurality of so-called friction plates concentric with the gear-set drive shaft which are urged into frictional engagement by spring means, to coact with the engine fly-wheel for delivering the torque of the engine crank-shaft to the gear-set shaft, at the will of the vehicle operator. In these clutch mechanisms, while provision is made for the requisite yieldability of the cooperating elements longitudinally of the gear-set shaft, for moving the friction plates into and out of effective engagement, the entire assembly is subject to those detrimental forces which emanate from the rigid connection of the plates to the gear-set shaft, through their supporting hub splined thereto. Obviously, the torsional strains imposed upon the clutch mechanism, not only as the clutch plates are engaged, but in the acceleration and deceleration of the vehicle, under operating conditions, are communicated to the gear-set and through the propeller shaft to the rear end drive, so that the entire power line is affected.

In the efforts to overcome the aforementioned disadvantages inherent to the standard types of motor-vehicle clutch mechanisms, various expedients have been proposed, as, for example, by connecting the plates to the clutch hub, through the medium of a yieldable or elastic material, as rubber. However, none of these attempts to solve the problem has been entirely successful, for one reason or another. While the advantages of utilizing an elastic material to obtain the requisite angular yieldability between the clutch plates and the hub of the mechanism, for neutralizing the effects of the torsional strains, are recognized, no satisfactory method has been evolved for confining the rubber and protecting it against excessive loads, so that it will perform its intended function, without a degree of deformation that soon renders it susceptible to disintegration, with a consequent rapid deterioration of the entire clutch assembly.

Therefore, it is the primary object of this invention to provide means for utilizing rubber or other elastic material for connecting the frictionally engageable surfaces, as the plates, of a clutch mechanism with the hub member of the assembly, whereby the previously described disadvantages that are inherent to existing constructions of the kind, will be eliminated in a simple, practical and economical manner.

Another important object of this invention is to provide a clutch mechanism, as aforesaid, wherein the frictionally engageable surfaces are connected to the clutch hub by an elastic material, which will be more efficient in operation and more highly resistant to wear than existing constructions, embodying a yieldable connection between the plates and the hub, this objective being attained by a method and means of controlling the deformation of the elastic material to the path of rotation of the interconnected elements of the mechanism, thus not only preserving the resiliency of the material for a long period, but entirely eliminating the tendency to disintegration that is a direct result of uncontrolled deformation and the consequent loss of resiliency.

A further object of my invention is to provide a clutch mechanism, possessing the herein set forth characteristics and advantages, wherein I employ means adapted to coact with the elastic connecting material, between the frictionally engageable surfaces and the clutch hub, under predetermined conditions in the functioning of the clutch mechanism to protect the elastic material against the imposition of excessive loads thereon, and the resultant impairment of its structure, such means, in conjunction with the control of the deformation of the material, making it possible to produce a clutch mechanism of the shock-absorbing type that will respond to the demands for greater durability of the assembly as a unit and less frequent overhauls and adjustments.

More specifically, it is the object of this invention to provide a clutch mechanism for motor-vehicles for coupling the transmission drive shaft to the engine fly-wheel, wherein the torsional strains and other forces which detrimentally affect the clutch mechanism and the units of the entire power line to which they are communicated therethrough, in structures of the conventional design, are dissipated or absorbed within the clutch mechanism itself, by the controlled deformation of a resilient driving connection between the clutch plates and the hub splined to the transmission drive shaft in response to the initiation of such forces, the connection being relieved under excessive load conditions for the maintenance of its shock-absorbing effectiveness.

Other objectives, such as the elimination or dampening of noises incidental to looseness of parts, through wear and increased smoothness in operation, will become manifest as the description proceeds and I would have it clearly understood that I reserve unto myself all rights to the full range of equivalents, both in structure and in use, to which I may be entitled under my invention, in its broadest aspect.

In the accompanying drawings, I have shown a preferred embodiment of my invention in a clutch mechanism of a conventional or standard design of the so-called plate or disc type. Obviously my invention may take other forms and may be incorporated in other clutch structures, within the scope of my invention, as defined by the appended claims.

In the drawings:

Figure 1 is a sectional elevation of a clutch mechanism of the multiple disc type produced in conformity with my invention, Figure 2 is a view in elevation of the hub sleeve 16 and its plate 8.

Figure 3 is a fragmentary plan view of one of the two rings of the cushioning unit.

Figure 4 is a sectional view on the line 4—4 of the preceding figure.

Figure 5 is a fragmentary plan view of the smaller ring of the aforesaid cushioning unit.

Figure 6 is a sectional view on the line 6—6 of Figure 5, and

Figure 7 is a sectional view of portions of the two rings, showing the association of their respective lugs.

Referring now to the drawings in detail, in which like characters of reference are employed to designate similar parts in the several views, the clutch mechanism, which is enclosed in the usual housing 7, embodies the customary clutch plates 8 and 9, provided with facings 8a—8b and 9a—9b and the coacting pressure plates 10 and 11 which are interconnected inwardly of their peripheries by suitable pins and cooperating springs (not shown) in radially spaced relation, for relative movement in a path parallel to the axis of the transmission drive shaft 12, mounted at its forward end in the usual pilot bearing 15, in response to the actuation of the clutch mechanism releasing means, generally indicated at 13, for rendering the clutch non-effective and in a counter direction to permit the aforesaid interconnecting springs to function to urge the clutch and pressure plates into close frictional association with each other and with the face of the fly-wheel 14 bolted, as at 15a, to the customary flange 15b of the engine crank-shaft 15 (not shown), through the medium of the facing 8a of the clutch plate 8, to transmit the driving torque from the engine shaft to the transmission drive shaft.

The components of the clutch mechanism just described and their mode of operation conform to standard design and practice and form no part of the present invention, except in so far as the structure may be adaptable in carrying my invention into effect.

The clutch hub comprises two independent or separate sleeves 16 and 17, splined to the transmission drive shaft 12, for movement longitudinally thereof, whereby the clutch and pressure plates may be actuated into and out of engagement, the clutch plate 8, as in existing clutch mechanisms being carried by the sleeve 16 while its counterpart 9 is supported from the sleeve 17. However, instead of these plates 8 and 9 being rigid with their respective sleeves, as in clutch mechanisms of standard types, they are connected thereto by a yieldable or elastic medium, as rubber, or a rubber composition, whereby the plates will be capable of torsional movement relatively to the sleeves, within predetermined limits, as hereinafter set forth.

Since the sleeves 16 and 17 and the manner in which the clutch plates 8 and 9 are respectively connected thereto for limited relative torsional or rotative movement, are identical, it is believed that a detailed description of the sleeve 16 and the interconnection of the plate 8 therewith, will suffice for the purposes of this disclosure.

As will be observed, the sleeve 16 embodies a preferably integral flange 16a, having a serrated or toothed periphery, as at 16b, the spacing of the teeth or projections and their dimensions depending upon the duty to which the clutch mechanism is to be applied and production or other requirements. In association with said flange 16a, I provide a surrounding concentric annulus 18 formed with recesses or spaces 18a into which the teeth or projections 16b of the flange protrude, the width of the recesses or spaces being greater than that of the teeth 16b, to provide for relative and conjoint rotative movement of the annulus and the hub sleeve 16, as and for the purposes hereinafter explained.

The sleeve 16, through its aforesaid flange 16a, is also connected to the annulus 18, independently of the connection which may be established between these parts by the interengagement of the coacting surfaces of the teeth and recesses thereof, under predetermined conditions in the functioning of the clutch mechanism, by a mass of resilient or elastic material. This material, which may be rubber or a product of similar characteristics, is a component of a structural element of the clutch mechanism which I shall term the cushioning unit.

In the formation of this cushioning unit, a collar 19 having an offset flange 19a is riveted to the flange 16a of the sleeve 16, as at 23, and functions as a support for a mass of resilient material, as rubber, indicated at 21, within which is embedded a series of cooperating non-yieldable elements, certain of which are rigid with the sleeve, while the others are fixed for rotative movement with the annulus 18. The said elements, in the present showing take the form of circumferentially spaced lugs 19b and 30b, stamped out of the body portions of the rings 20 and 30 and disposed at a right angle thereto, as is clearly shown in Figures 4, 6, and 7. As will be noted, especially from Figures 3 and 5, the rings 20 and 30 are of different diameters, the smaller 30, embodying a flange 30a offset inwardly of the body portion and apertured at 30c for the reception of the aforesaid rivets 23, which function to anchor the collar 19 to the sleeve flange 16a, the cut-outs 31, whereby the lugs 30b are formed being in the outer periphery of the ring body. In the larger ring, as will be observed, the cut-outs for the formation of its lugs 19b are spaced along its inner periphery, this ring, likewise, being provided with an offset attaching flange 20a, apertured at 20c, for the reception of the rivets 22, whereby it is made rigid with the annulus 18, these rivets also serving to secure the clutch plate 8 to said annulus for movement therewith.

When the rings 20 and 30 are assembled in concentric relation on the sleeve 16 and annulus 18, respectively, as described, their lugs 19b and 30b will be oppositely disposed in laterally spaced relation, as shown in Figure 7, or in any suitable variation of such arrangement, it being evident that the resilient material 21, in which the lugs of the two rings are embedded completely encloses them and fills the spaces therebetween, so that, in effect, the rings 20 and 30 and the collar 19, with the resilient material, which is united to said rings and collar by an appropriate vulcanization process form an integral structure, in which the two rings are relatively rotatable, within the elastic limits of the rubber within which their lugs are confined, as hereinafter pointed out.

From the construction described, it will be apparent that the cushioning unit provides a yieldable or shock-absorbing coupling between the annulus 18, to which the clutch-plate is fixed for co-movement, and the hub sleeve 16, the deformation of the rubber under load to dissipate therewithin the detrimental forces transmitted to the unit, being controlled to virtually confine it to the direction of torque. It will be obvious that the formation of the rings 20 and 30 and the interposition of their lugs in the path along which the load forces are distributed contribute to this result, the lugs functioning as abutments upon which the rubber cushions under load. Also, by the arrangement of the cooperating metallic components of the cushioning unit and their union with the elastic material, a more rugged and better wear-resisting construction is obtainable by conforming to existing practice, and without sacrificing those advantages which are inherent to the latter material.

In operation, the clutch and pressure plates of the two units of the mechanism are urged into frictional surface engagement, with the facing 8a of the plate 8 contacting the face of the flywheel 14, as heretofore described, under the control of the operator, through the medium of the shifting means, indicated at 13. Now, as the plates are pressed into close association with each other and frictionally coupled to the flywheel, the effort will be transmitted from the plates, through the cushioning unit to the hub sleeves and drive shaft of the transmission, the elastic material, cushioning upon the lugs 19b and 30b in the path of rotation of the clutch mechanism elements, to provide for the requisite relative torsional or rotative movement of the plates and hub sleeves, in a degree determined by the torsional forces developed in the application of the driving torque to the driven elements of the power line. In other words, the cushioning unit functions to connect the plates and the hub for relative torsional movement, in response to torsional forces which, in the absence of such controlled movement, as has just been described, are communicated to and detrimentally affect the entire power line. Obviously, the elastic material eliminates vibrations that are the product of sudden acceleration or deceleration of the engine or driving members, by providing for the relative movements between the plates and their supporting hub sleeves and acts to cushion the clutch mechanism assembly against mechanical and other shocks to which it is subject in the operation of a vehicle. Further, by virtually confining the rubber, for deformation only within itself, it will be manifest that its capacity for absorption and dissipation of detrimental forces transmitted thereto will be greater than where it may yield in a multiplicity of directions or zones.

As will be understood, the relative rotative or torsional movement of the plates and the hub sleeves, under the control of the elastic material, is limited to protect the material against rending forces, under overload conditions, by the engagement of the teeth 16b of the sleeve 16 (or those of the corresponding sleeve 17) with the end-defining surfaces of the recesses in the cooperating annulus, the hub sleeve and the annulus rotating as a unit when the teeth are engaged in said recesses and establishing a positive connection between the plates and the hub of the mechanism. The degree of relative movement of the hub sleeve and associated annulus, as will be evident, may be regulated by the size or width of the recesses in proportion to that of the teeth, the latter being freely movable within the recesses in response to the functioning of the elastic material under normal load conditions.

While I have described my invention with reference to the specific showing, it will be clear that various departures from the structure illustrated may be made and that the method and means employed for connecting the plates for movement relatively to their supporting hub may be adapted to other types of clutch mechanisms or power transmitting media, within the spirit and scope of this disclosure.

I claim:

1. A clutch mechanism including a hub member and a friction plate mounted for relative and conjoint movement, an annulus rigid with said hub member and provided with a toothed periphery, a surrounding ring rigid with said plate formed with recesses into which the teeth of said annulus are entered, the width of said recesses being greater than that of said teeth, whereby said annulus and said ring may function to connect said hub member and said plate only in response to rotative movement of one or the other thereof, and means separate from said annulus and said ring permanently yieldably connecting said hub member and said plate, said latter means including concentric metallic members respectively positively connected to the hub member and plate, one of said concentric members embodying circumferentially spaced abutments, and a mass of elastic material interposed between said concentric members and united thereto and to said abutments by vulcanization, said abutments being surrounded by said elastic material and functioning to limit deformation thereof in the direction of torque effective upon said plate and hub member connecting media.

2. A clutch mechanism including a friction plate, a hub member for supporting said plate for rotative movement and for actuation into and out of functioning position, said hub member being adapted to be slidably connected to a rotatable element, means for connecting said plate to said hub member for relative torsional movement as said plate is urged into functioning position, or when functioning, said means comprising a collar concentric with said hub member, a ring concentric with said collar, said collar and said ring being fixed to said hub member for movement therewith, an annulus surrounding said hub member, a ring carried by said annulus, each of said rings having integrally formed circumferentially spaced lugs oppositely disposed and laterally spaced relatively to one another to form abutments between said rings, an elastic material supported upon and united to said collar and to said rings by vulcanization, said elastic material enveloping said lugs and forming a cushion therebetween and means on said hub member and said annulus to render said annulus and said hub member capable of limited relative rotative movement under the control of said elastic material and to interlock said hub member and said annulus for conjoint rotative movement upon the completion of their relative limited rotative movement.

BENJAMIN B. BACHMAN.